United States Patent
Zhang et al.

(10) Patent No.: US 11,068,384 B2
(45) Date of Patent: Jul. 20, 2021

(54) SYSTEMS AND METHODS FOR TESTING SOFTWARE APPLICATIONS

(71) Applicant: PAYPAL, INC., San Jose, CA (US)

(72) Inventors: Pengshan Zhang, Shanghai (CN); Jun Zhang, Shanghai (CN); Xiaohan Yun, Palo Alto, CA (US); Xin Chen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 12 days.

(21) Appl. No.: 16/709,413

(22) Filed: Dec. 10, 2019

(65) Prior Publication Data

US 2021/0173767 A1    Jun. 10, 2021

(51) Int. Cl.
| | |
|---|---|
| *G06F 9/44* | (2018.01) |
| *G06F 11/36* | (2006.01) |
| *G06F 9/46* | (2006.01) |
| *G06F 16/21* | (2019.01) |

(52) U.S. Cl.
CPC .......... *G06F 11/3688* (2013.01); *G06F 9/466* (2013.01); *G06F 11/3664* (2013.01); *G06F 16/211* (2019.01)

(58) Field of Classification Search
None
See application file for complete search history.

(56) References Cited

U.S. PATENT DOCUMENTS

| | | | | |
|---|---|---|---|---|
| 7,472,224 | B1* | 12/2008 | Klass | G06F 11/2236 711/100 |
| 2003/0172321 | A1* | 9/2003 | Wolin | G06F 11/2215 714/41 |
| 2008/0215925 | A1 | 9/2008 | Degenaro et al. | |
| 2008/0271025 | A1 | 10/2008 | Gross et al. | |
| 2013/0007523 | A1 | 1/2013 | Unger et al. | |
| 2013/0042146 | A1* | 2/2013 | Unger | G06F 11/3672 714/32 |
| 2017/0242784 | A1 | 8/2017 | Heorhiadi et al. | |
| 2017/0286691 | A1 | 10/2017 | Leavy et al. | |
| 2018/0060460 | A1* | 3/2018 | Zhang | G06F 11/3006 |

* cited by examiner

*Primary Examiner* — Qamrun Nahar
(74) *Attorney, Agent, or Firm* — Haynes and Boone, LLP

(57) ABSTRACT

Methods and systems are presented for testing software applications in a production-like environment that simulates real-world failures of production environments. A production environment has production applications and databases configured to process user requests from users for conducting transactions with a service provider. A testing system provides an intermediate interface that enables a software application operating in the test environment to access at least one of a production application or a production database. The intermediate interface can be configured based on different failure configurations to simulate production component failures in the production environment. Failure injection and randomized failure modes can be employed, including for network-related failures (latency, dropped packets, connections, etc.) that might occur in the production environment.

20 Claims, 5 Drawing Sheets

SYSTEMS AND METHODS FOR TESTING SOFTWARE APPLICATIONS

BACKGROUND

The present specification generally relates to testing of software applications, and more specifically, to stress testing software applications in a pseudo-production environment that simulates failures in a production environment, including chaos injection/failure injection modes that may be randomized, according to various embodiments of the disclosure.

RELATED ART

A software application may go through various testing in a testing environment before it is released to a production (e.g., live) environment, where the software application may be accessed by users. A testing environment may be different from a production environment as a testing environment is typically insulated from the end users of the software application and from some or all other production components (e.g., other software applications running in the production environment, production databases, etc.). This isolation is typically employed so that production components and production data would not be affected by the testing process (including when the software application under test does not function properly).

Test data can be used instead of actual user account data (e.g., non-testing data) from the production environment in the testing environment, for example, such that the software application under test would not corrupt the actual user account data. In some cases, incompatible data and/or commands (or exceptions) may be provided to the software application to determine whether the software application can perform proper error handling.

However, no matter how rigorous the testing is, testing the software application in the testing environment may not be able to trigger certain issues that would only arise when running the software application in the production environment. This is why many software applications, even after tested rigorously, may still be found defective (e.g., contains software bugs, etc.) after the software applications are released in the production environment. Thus, Applicant recognizes there is a need for providing a mechanism to test a software application in a production-like environment such that defects that would surface in the production environment can be detected and cured before the software application is released to the users.

Figure 1:
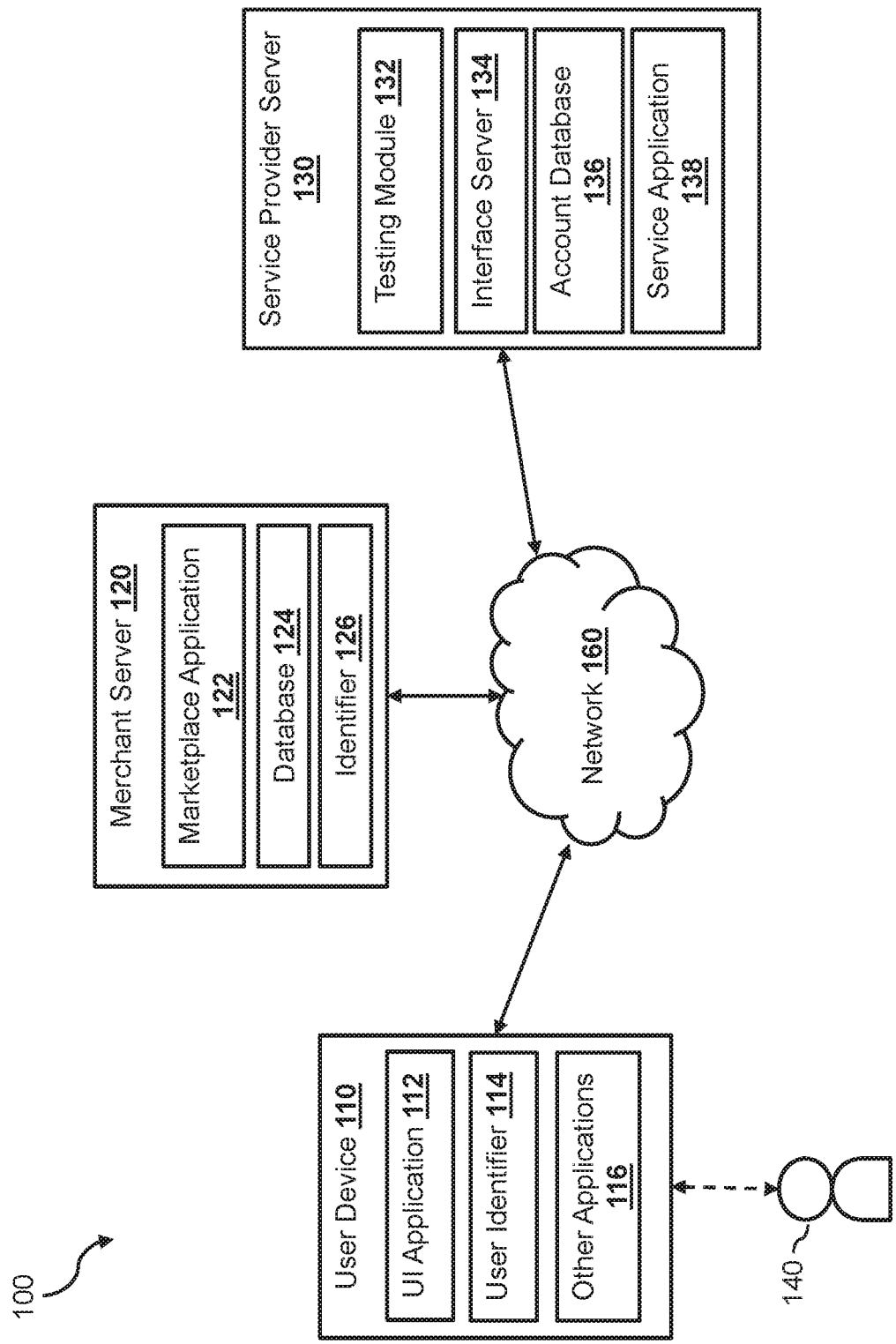
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for testing software applications in a pseudo-production environment that simulates real-world failures in a production environment. This is accomplished by using as much production technology as possible in various embodiments (e.g. connecting to production databases, production software applications, via production network connections). Such resources and network connections can be managed through a testing configuration interface that allows more robust failure testing (including random failure injection) than other methods of testing.

A software application being tested may be a new application to be released in a production environment, a new version of an existing production application that is already running in the production environment, or an update that includes new features for an existing production application, among other things. As discussed above, testing software applications in a typical testing environment has its limitations, as certain defects of the software applications may not be detected in the testing environment (e.g., may only appear in a production environment). This is because a typical testing environment may not correctly account for the difficulties and failures that can be encountered in complex distributed computing service infrastructure.

In some embodiments, the production environment is an environment where production software applications run, and where production databases reside. Production software applications running in the production environment and production databases residing in the production environment maybe accessible to end users (e.g., accessible by the public over a public network, and/or to internal users over a non-public network). Actual user data of the users is stored in at least some of the production databases, such that as the production applications process user requests from the users, the production applications may modify the actual user data in the production databases to conduct real-world transactions. For example, when the software applications running in the production environment are associated with an online banking institution, users may interact with a production application running in the production environment to submit banking related transaction requests (e.g., payment requests, fund transfer requests, account creation requests, etc.). The production application may then process the transaction requests by performing processing on user data stored in a production database to perform real-world transactions such as payment transactions, fund transfer transaction, account creation transactions, etc.

By contrast, a typical testing environment can be an environment where software applications may run wholly (or largely) isolated from production components. While production data might be used in a testing environment (e.g. data can be replicated and used for test), the complex network interactions and inter-service dependencies of a software application may not be able to be fully tested within such a typical testing environment.

As such, interacting with software applications in the testing environment (e.g., activating certain features of the software applications such as triggering a transaction, etc.) typically does not have any real-world impact. In some embodiments, applications similar to the production applications (e.g., copies of the production applications) and databases similar to the production databases (e.g., copies of the production databases, databases containing arbitrary data or testing data, etc.) may run in the testing environment such that the software application being tested may interact with those applications and databases while performing certain functions and/or providing certain features without affecting the production environment and the actual user data stored in the production environment. And even if connections to actual production databases were used in a typical testing environment, stress testing of network connections and inter-service dependencies on other real-world production services may be difficult or impossible.

Thus, as discussed above, certain software defects of a software application may only occur in the production environment due to failures of one or more production components in the production environment that might be difficult to replicate in the testing environment. It is because the testing environment may use different components (e.g., simplified databases, etc.) and/or may provide different traffic patterns (e.g., different types of user request being submitted instead of a large number of the same type of user requests being submitted in a short burst, etc.) to test the software application. For example, the network connection to one or more of production database nodes of a distributed database in the production environment may have problems (e.g., connection failures, bandwidth reduction, etc.), possibly caused by the large amount of network traffic and transaction requests being handled by a production application in the production environment. What might happen, for example, when a software application that depends on two different databases to service requests experiences a 100% increase in latency and a 25% increase in dropped connections to Database #1 while available network bandwidth to Database #2 drops from 10 Mbps (megabits per second) to 2.4 Mbps due to a denial of service (DoS) attack against the service provider?

In another example of a complex production environment dependency problem, a data schema compatibility failure may occur when incompatible database schemas are used by a production application and a production database, possibly due to an update (or changes) to the application or the database without updating (or changing) the other. These real-world production component failures may trigger one or more exceptions (e.g., a connection timeout exception) or errors (e.g., a connection error, a data object compatibility error, etc.), which may cause a software application to behave in an unpredictable way. Thus, testing the software application strictly in the testing environment may not be sufficient as certain defects of the software application can only be uncovered in the production environment.

Therefore, according to various embodiments of the disclosure, a testing system may provide a pseudo-production environment (also known as an incubation environment) for testing software applications. In some embodiments, similar to the testing environment, the pseudo-production environment may not be accessible by the actual or end users of the software application. However, unlike the testing environment, the testing system may provide an intermediate configurable layer within the pseudo-production environment to enable a software application running in the pseudo-production environment (e.g., a software application being tested) to access one or more of the production applications and/or one or more production databases through the intermediate layer. Furthermore, in some embodiments, the testing system may intercept or obtain at least a portion of user requests submitted to one or more production applications in the production environment. The testing system may then generate copies of the user requests and provide the copies of the user requests to the software application in the pseudo-production environment for processing. When the software application in the pseudo-production environment receives the copies of the user requests, the software application may process the user requests by interacting with at least one of the production applications or production databases via the intermediate layer of the pseudo-production environment.

By testing the software application using real-world user requests and by enabling the software application to interact with at least one of the production components (e.g., production applications, production databases, etc.) when processing the real-world user requests, the software application may encounter, in the pseudo-production environment, the same or similar production component failures that arise in the production environment. For example, when a connection to one of the production databases suffers from low bandwidth (e.g., slow connection speed) due to the volume of traffic or has even become unavailable (e.g., the production database is down or otherwise offline), a production application running in the production environment would encounter the connection issue (or failure) with the production database while processing a user request. Since the software application running in the pseudo-production environment may interact with that production database while processing a user request, the software application may also encounter the same connection failure in the pseudo-production environment, which enables the testing system to detect any defects of the software application that may be triggered or caused by the connection failure. In some embodiments, the testing system may obtain real-world user requests (e.g., from the production environment), generate copies of the user requests, and submit the copies of the user requests to the software application for processing within the pseudo-production environment over a period of time (e.g., an hour, a day, etc.) so that any issues or failures that would or may occur in the production environment would also affect the software application in the pseudo-production environment. This way, hidden defects of the software application that may arise only under certain circumstances (e.g., database connection issues and/or database failures, etc.) may be detected when the issues and/or failures occurred in the production environment.

However, one drawback of such an approach is that one cannot control when and whether the real-world failure will occur in the production environment. Thus, even though the testing system may perform the testing process on a software application within the pseudo-production environment as described above for a period of time, it is possible that the testing system may not be able to detect any hidden defects of the software application because no failures have occurred in the production environment during the period of time. As such, according to various embodiments of the disclosure, the testing system may configure the pseudo-production environment to simulate one or more production component failures artificially. In some embodiments, the testing system may simulate the one or more production component failures in the production environment by configuring the pseudo-production environment based on one or more failure configurations.

In some embodiments, the testing system may simulate a production component failure in the production environment by configuring the intermediate layer of the pseudo-production environment. As discussed herein, the intermediate layer is provided in the pseudo-production environment for enabling the software application running in the pseudo-production environment to access one or more production components in the production environment. As such, the software application is required to go through the intermediate layer to access the production component (e.g., accessing a production database, etc.). Under a normal configuration where no failures are being simulated by the pseudo-production environment, the intermediate layer may act as a passthrough by passing any access request by the software application to the corresponding production component without any modification (except when it is a write request for writing a data in a production database).

However, the testing system may configure the intermediate layer based on one or more failure configurations. Each failure configuration may modify the behavior of the intermediate layer. For example, to simulate a database failure associated with a production database, the testing system may configure the intermediate layer to return an error signal (e.g., a database connection failed signal, a database unavailable error signal, etc.) when the software application attempts to connect to the production database via the intermediate layer, even though the production database is online and is connectable by a production application within the production environment.

In another example, to simulate different types of connection failure associated with a connection to a particular production database, the testing system may configure the intermediate layer to adjust different parameters of a connection request for the particular production database submitted by the software application. For example, to simulate a speed reduction failure (latency), the testing system may configure the intermediate layer to delay relaying the connection request to the particular production database. To simulate a bandwidth reduction failure, the testing system may configure the intermediate layer to adjust a timeout parameter (e.g., reducing the timeout parameter by a predetermined amount, etc.) of a connection request for the particular production database submitted by the software application, such that the connection request to the particular database submitted by the software application may timeout faster than a similar connection request to the particular database submitted by a production application within the production environment. To simulate a dropped packet failure, the testing system may configure the intermediate layer to discard one or more data packets between the software application and the particular database based on the connection request.

In yet another example, to simulate a database schemas compatibility failure, the testing system may generate (or modify) a local copy of a database schema (e.g., stored locally in the pseudo-production environment) that is associated with a particular production database in the production environment. The local copy of the database schema may be generated to be different from the actual database schema for the particular database. When the intermediate layer receives a request from the software application in the pseudo-production environment to access the particular database, the intermediate layer may use the local copy of the database schema to access the particular database such that incorrect data or an error may be returned to the software application to artificially trigger a database schema compatibility failure.

By configuring the pseudo-production environment according to different failure configurations, the testing system may simulate different production component failures in the production environment for testing the software application in the pseudo-production environment without actually affecting the production components in the production environment. In some embodiments, the testing system may configure and re-configure the pseudo-production environment (e.g., the intermediate layer) based on various failure configurations according to a schedule. For example, the testing system may configure the pseudo-production environment based on a first failure configuration to simulate a first production component failure in the pseudo-production environment, and may test the software application in the pseudo-production environment by providing copies of the user requests received in real-time during a first period of time to the software application for processing. The testing system may then re-configure the pseudo-production environment based on a second failure configuration to simulate a second production component failure in the pseudo-production environment, and may test the software application in the pseudo-production environment by providing copies of the user requests received in real-time during a second period of time to the software application for processing. The testing system may continue to re-configure the pseudo-production environment based on different failure configurations according to a predetermined schedule such that the software application is tested under different production component failures (or different combinations of production component failures).

The testing system may monitor responses (and/or behavior) of the software application when the software application processes the copies of the user requests under different simulated production component failures. In some embodiments, the testing system may determine a status of the software application based on the responses and/or behavior of the software application during the testing process. For example, when it is determined that the way that software application responds and/or behaves satisfies one or more predetermined test requirements (e.g., responds and/or behaves according to designed or a specification of the software application) during the testing process, the testing system may determine that the software application has passed the test and is ready to be released to the production environment. On the other hand, if it is determined that the way that the software application responds and/or behaves fails one or more predetermined test requirements (e.g., not according to design or outside of the specification) when processing a user request under any one of the feature configurations, the testing system may determine that the software application is defective (e.g., not fully robust) and is not ready to be released to the production environment. Furthermore, the testing system may determine under which failure configuration(s) that the software application fails a test (e.g., responds and/or behaves not according to design) and present a failure report to a user indicating the failure configuration(s) under which the software application fails. Thus, by testing a software application using real-world user requests and production components and by artificially simulating failure of one or more of the production components, hidden defects of the software application may be detected and cured before it is released to the production environment.

FIG. 1 illustrates an electronic transaction system 100 within which the testing system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120 or a point-of-sale (POS) system associated with the merchant server 120 through one or more software applications associated with the service provider server 130 and/or the merchant server 120. The user 140 may also log in to a user account to access account services or conduct electronic transactions (e.g., payment transactions, fund transfer transaction, adding a funding source transaction, onboarding transactions, etc.) with the service provider server 130. Similarly, a merchant associated with the merchant server 120 may use the merchant server 120 to log in to a merchant account to conduct electronic transactions (e.g., payment transactions, onboarding transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile application, etc.), which may be utilized by the user 140 to conduct electronic transactions (e.g., online payment transactions, etc.) with the service provider server 130 over the network 160. In one implementation, the user interface application 112 includes a proprietary software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may be one of the device attributes requested by the webpages. Thus, when executing the one or more functions based on the API calls, the user interface application 112 may retrieve the device identifier (e.g., from the registry of the user device 110, from the operating system running on the user device 110, etc.) and provide the device identifier to the webpages.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide electronic transaction services for the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other electronic transaction services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content (e.g., webpages) in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. At least some of the pages (e.g., webpages) served to users are associated with electronic transactions. For example, the interface server 134 may store a log-in page (e.g., log-in webpage) and is configured to serve the log-in page to users for logging into user accounts of the users to access various service provided by the service provider server 130. The interface server 134 may also store a payment page (e.g., a payment webpage) and is configured to serve the payment page to users for conducting electronic payment transactions. As a result, a user may access a user account associated with the user and access various electronic services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

User profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items, which can also be used to determine whether a request is valid or fraudulent.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In some embodiments, the interface server 134, the account database 136, and the service application 138 are all production components running in a production environment of the service provider server 130.

In various embodiments, the service provider server 130 includes a testing module 132 that implements the testing system as discussed herein. In some embodiments, the testing module 132 is configured to provide a pseudo-production environment for testing software applications before the software applications are released to the production environment. In some embodiments, the software application(s) being tested may be associated with or implements one or more features of at least one of the production components (e.g., the interface server 134, the account database 136, and/or the service application 138) of the service provider server 130. The testing module 132 may intercept or otherwise obtain user requests submitted to the interface server 134 and/or the service application 138 (e.g., user requests submitted by the user device 110 and/or the merchant server 120). The testing module 132 may then generate copies of the user requests and provide the copies of the user requests to the software application for processing within the pseudo-production environment. The pseudo-production environment may enable the software application to access at least one of the production components when processing the copies of the user requests, for example, via an intermediate layer within the pseudo-production environment. In some embodiments, the testing module 132 may configure the pseudo-production environment based on one or more failure configurations to simulate one or more production component failures in the production environment, such that the software application may encounter one or more artificially created (e.g., simulated) production component failure when processing the copies of the user requests within the pseudo-production environment, without actually affecting the production components in the production environment (e.g., without requiring an actual production component failure). Note that, while not discussed, the merchant server 120 may also have a testing module similar to the testing module 132 of the service provider server 130. Such a merchant testing module would operate in a similar fashion as discussed herein with the service provider testing module 132, but for actions, processes, and features offered from or processed by the merchant server 120.

Figure 2:
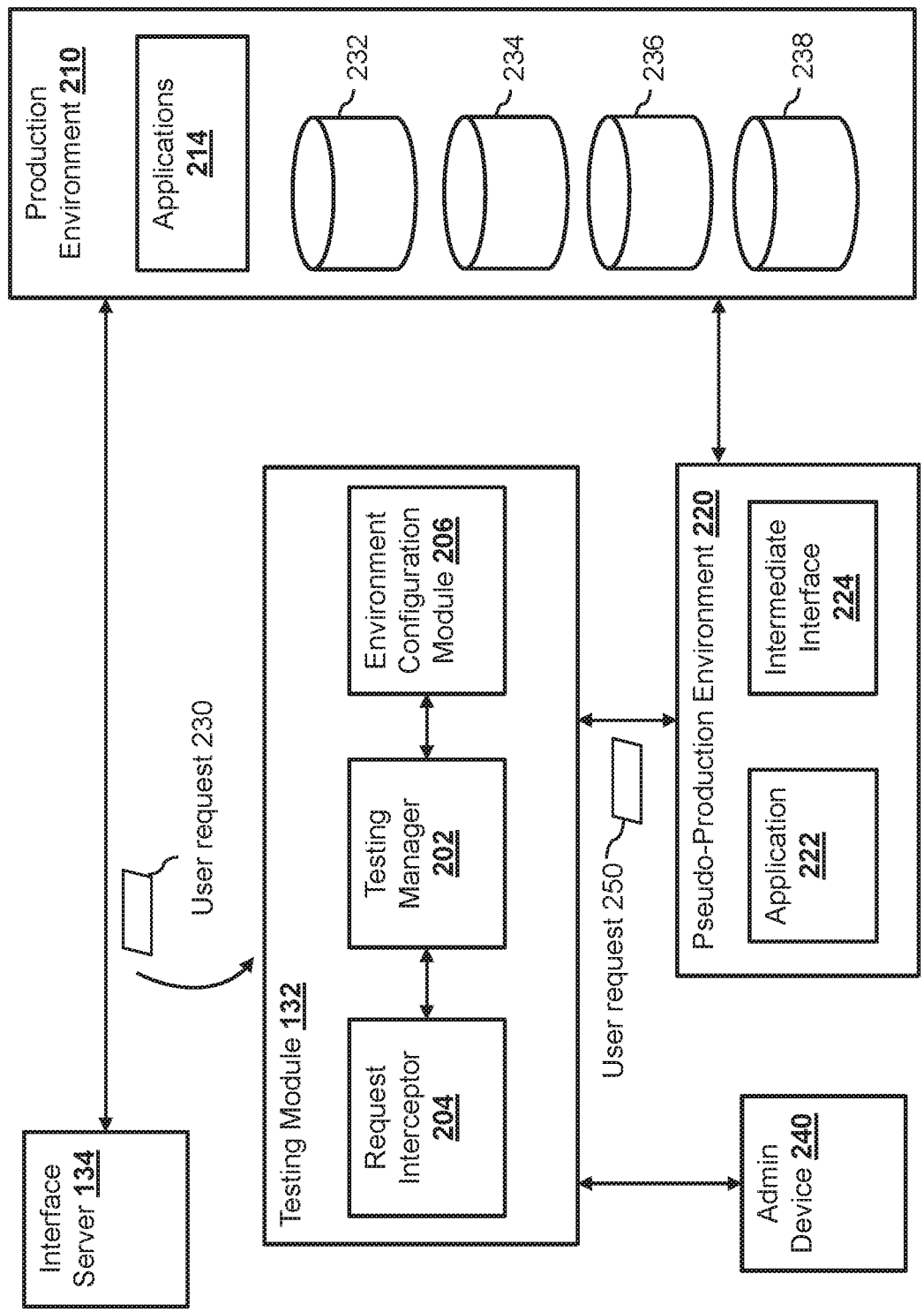
FIG. 2 is a block diagram illustrating a testing module according to an embodiment of the present disclosure.

FIG. 2 illustrates a block diagram of the testing module 132 according to an embodiment of the disclosure. The testing module 132 includes a testing manager 202, a request interceptor 204, and an environment configuration module 206. These components, as with others in this figure, may be implemented as stored executable computer instructions in various embodiments. In some embodiments, the testing manager may provide a pseudo-production environment for testing software applications (e.g., a software application 222) before they are released to a production environment 210, where production components are accessible by users to conduct transactions with the service provider server 130. As discussed above, the software application 222 that is being tested in the pseudo-production environment 220 may be a new application to be released to the production environment 210, an update that implements new features for one of the existing production applications 214, a new version of one of the existing production applications 214, or any application where it is desirable to test the application before releasing it into production.

In some embodiments, the production environment 210 is accessible by the users of the service provider server 130. For example, the users (e.g., the user 140 or a merchant associated with the merchant server 120) may access the production applications (e.g., use functions or features provided by the production applications) by interacting with an interface provided by the interface server 134 (e.g., a website, a mobile application, etc.). Through the interface provided by the interface server 134 and presented on the user device 110 and/or the merchant server 120, the users may submit user requests (e.g., a user request 230) for performing one or more transactions with the service provider server 130. The user requests may include a request for creating a new account with the service provider server 130, a request for performing a payment transaction using a user account with the service provider server 130, a request for editing user information associated with a user account, a request for content, etc. Note that in various embodiments, however, the testing schemes described herein may be used with other software architectures as desired.

As such, the production environment 210 may include production components for processing the user requests. The production components may include one or more production applications 214 and one or more database nodes 232-238. One or more of the database nodes 232-238 may be configured to store data related to the accounts database 136. To process the user requests, the applications 214 may be configured to access (e.g., reading data from, writing data to, etc.) the database nodes 232-238 to effect actual transactions with the service provider server 130.

The pseudo-production environment 220 provided by the testing manager 202 is different from the production environment 210 in that the pseudo-production environment 220 insulates the software applications (e.g., the software application 222) operating within the pseudo-production environment 220 from the users of the service provider server 130 (e.g., users do not have access to interact with the software applications operating in the pseudo-production environment 220). Furthermore, the testing manager 202 may configure the pseudo-production environment 220 such that any processing performed by software applications within the pseudo-production environment 220 would not affect (e.g., would not cause any changes to) any production components of the production environment 210.

Many testing environments provide safety to the production components by completely insulating the testing environment from a production environment to avoid corrupting data in the production environment (e.g., by providing test databases with test data, etc.). However, such conventional testing environments may not provide the circumstances that would trigger one or more hidden defects of software applications that would only be detected in the production environment (e.g., defects that can only be detected under real-world production failures, etc.). As such, such testing environments may fail to fully test the software applications. By contrast, the pseudo-production environment 220 is provided to simulate the production environment 210 such that the software applications operating within the pseudo-production environment 220 would encounter the same or substantially similar issues and/or failures as the production applications operating within the production environment 210. In some embodiments, it does so in two folds. First, the testing manager 202 of some embodiments may simulate the request traffic of the production environment 210 by providing the software application 222 within the pseudo-production environment 220 the same or similar user request traffic as the production environment 210.

For example, the testing manager may use the request interceptor 204 to intercept or otherwise obtain user requests that are submitted to the production environment 210 for processing. In some embodiments, the request interceptor 204 may monitor any user requests passing to the production environment 210 (e.g., requests that are received by the interface server 134, etc.) and may generate copies of the user requests. For example, the request interceptor 204 may intercept the user request 230 that is being transmitted to the production environment 210 for processing by one or more of the production components (e.g., the production applications, the production database nodes 232-238, etc.). The user request 230 may be generated based on an interaction of a user (e.g., the user 140, a merchant associated with the merchant server 120, etc.) with an interface provided by the interface server 134 (e.g., a website, a mobile application, etc.). After intercepting the user request 230, the request interceptor may generate a copy of the user request (e.g., a user request 250). The original user request 230 may continue its path to the production environment 210 for processing within the production environment 210. However, the testing manager 202 may also provide the copy of the user request 230 (e.g., the user request 250) to the software application 222 for processing within the pseudo-production environment 220. In some embodiments, the testing manager 202 may provide copies of all or a portion of (e.g., 80%, 50%, 30%, etc.) the user requests submitted to the production platform 210 to the software application 222 in the pseudo-production environment 220 within a period of time (e.g., an hour, a day, etc.), such that the software application 222 has to handle the same or substantially similar load and to process the same or substantially similar types of user requests as the production environment 210. Note that the operations of routing a production user request to production components and copying it for use in the pseudo-production environment 220 may be performed at different times, in various embodiments. For example, a production user request may be handled as normal, but saved and later replayed for use within the pseudo-production environment 220 for testing purposes (e.g., delayed for several minutes, several hours, several days, or delayed until triggered by a user). In other instances, however, the production user request can be processed through the pseudo-production environment 220 with minimal delays (e.g. operating in near real time or in parallel with the actual production environment).

Second, instead of completely insulating the testing environment (e.g., the pseudo-production environment 220) from the production environment 210, the testing module 132 may enable the software application 222 to access one or more of the production components (e.g., the production applications 214, the production database nodes 232-238, etc.) when processing the copies of the user requests within the pseudo-production environment 220. As discussed herein, while processing the user requests, the production applications 214 in the production environment may have to interact with other production applications (e.g., using a function or a feature of another production application via an application programming interface (API) call, etc.) and/or accessing one or more of the production database nodes 232-238 (e.g., reading from and/or writing to a production database node). Conventional testing environments may provide testing applications or testing databases within which to interact with the software application 222 while testing the software application 222. By contrast, the testing module 132 may enable the software application 222 to interact and/or access one or more of the production components in the production environment 210 while testing the software application 222 (e.g., when the software application 222 is processing copies of the user requests). For example, the software application 222 may access the production database to retrieve data when processing a user request.

To avoid corrupting the production environment (e.g., production data stored in the production database nodes 232-238, state data associated with the production applications 214, etc.), the testing module 132 may provide an intermediate layer, such as an intermediate interface 224, between the software applications running within the pseudo-production environment 220 (e.g., the application 222) and the production environment 210, such that all access requests (e.g., a read/write request to a production database node, an API call to a production application, etc.) that software applications within the pseudo-production environment 220 transmit to the production components would go through the intermediate interface 224. In some embodiments, the testing module 132 may configure the intermediate interface 224 to manage and control accesses to the production environment 210 based on the user request.

In an example where the user request 250 is a request for obtaining a balance of an account, the software application 222 may process the request by accessing one or more of the database nodes 232-238 for retrieving balance data associated with the account. The software application 222 may access the database nodes 232-238 by sending a read request (e.g., in the form of a query) to the database nodes 232-238. However, since the software application 222 is operating within the pseudo-production environment 220, any requests to access a production component (e.g., a query for a database node, an interaction with a production application, etc.) may be intercepted by the intermediate interface 224. For a read access request (e.g., reading the balance data of the account), the intermediate interface 224 may be configured to act as a passthrough, where the read request is relayed to the production component (e.g., the database nodes 232-238) without any modification. When the intermediate interface 224 receives the requested data (e.g., the balance data) from one or more of the database nodes 232-238, the intermediate interface 224 may be configured to pass the data back to the software application 222. The software application 222 may perform additional processing (e.g., formatting, generating a display, etc.) before transmitting a response to the user request 250 back to the testing manager 202.

In another example, the user request 250 may be associated with a request for writing new data into one or more of the database nodes 232-238 (e.g., creating a new account request, adding a new funding source request, updating user information request, etc.). While processing the user request 250, the software application 222 may submit a write request to one or more of the database nodes 232-238 via the intermediate interface 224. In this example, since a similar write request would also be submitted by one or more of the production applications 214 while processing the original user request 230 to write data into one or more of the database nodes 232-238, the testing module 132 needs to avoid double processing of the write request to prevent data corruption (e.g., when the write request includes incrementing a counter). Thus, the testing manager 202 may use the environment configuration module 206 to configure the intermediate interface 224 to either disregard any write request or alter the write request to write to a different database (e.g., a database specifically for testing purpose, etc.). Based on that configuration, the intermediate interface 224 may either disregard the write request submitted by the software application 222 or modify the write request such that the data is written in a testing database within the production environment 210. The intermediate interface 224 may also return a signal to the application 222 indicating that the data has been successfully written to the database, so that the software application 222 may continue to perform any additional processing and return a response to the user request 250 to the testing manager 202.

By testing the software application 222 using real-world user requests (e.g., the user request 250) and by enabling the software application 222 to interact and/or access with one or more of the production components (e.g., production applications 214, production database nodes 232-238, etc.) when processing the real-world user requests, the software application 222 may encounter, in the pseudo-production environment 220, the same or similar real-world production component failures that arise in the production environment 210. For example, when a connection to one of the production database nodes 232-238 suffers from low bandwidth (e.g., slow connection speed) due to the volume of traffic or has even become unavailable (e.g., the production database is down or otherwise offline), a production application 214 running in the production environment 210 would encounter the connection issue (or failure) with the production database node while processing a user request (e.g., the user request 230). Since the software application 222 running in the pseudo-production environment 220 may interact with that production database while processing a user request, the software application 222 may also encounter the same connection failure in the pseudo-production environment 220, which enables the testing manager 202 to detect any defects of the software application 222 that may be triggered or caused by the connection failure. As discussed herein, in some embodiments, the testing module 132 may submit all or at least a portion of the real-world user requests to the software application 222 for processing within the pseudo-production environment 220 over a period of time (e.g., an hour, a day, etc.) so that any issues or failures occurred in the production environment 210 during the period of time would also affect the software application 222 in the pseudo-production environment 220. This way, hidden defects of the software application 222 that may arise only under certain circumstances based on production component failures (e.g., database connection issues and/or database failures, etc.) may be detected when the issues and/or failures occurred in the production environment 210 during the period of time.

However, one drawback of such an approach is that one cannot control when and whether any real-world production component failure will occur in the production environment 210. Thus, even though the testing module 132 may perform the testing process on the software application 222 within the pseudo-production environment 220 as described above for a period of time, the testing module 132 may not be able to detect any hidden defects of the software application because no production component failure has occurred in the production environment 210 during the period of time. The testing module 132 may extend the period of time or repetitively test the software application 222 until a production component failure occurs, but that is both time consuming and inefficient. As such, according to various embodiments of the disclosure, the testing manager 202 may use the environment configuration module 206 to configure the pseudo-production environment 220 to simulate one or more real-world production component failures. In some embodiments, the testing module 132 may simulate the one or more real-world production component failures in the production environment 210 by configuring the pseudo-production environment 220 based on one or more failure configurations.

Figure 3:
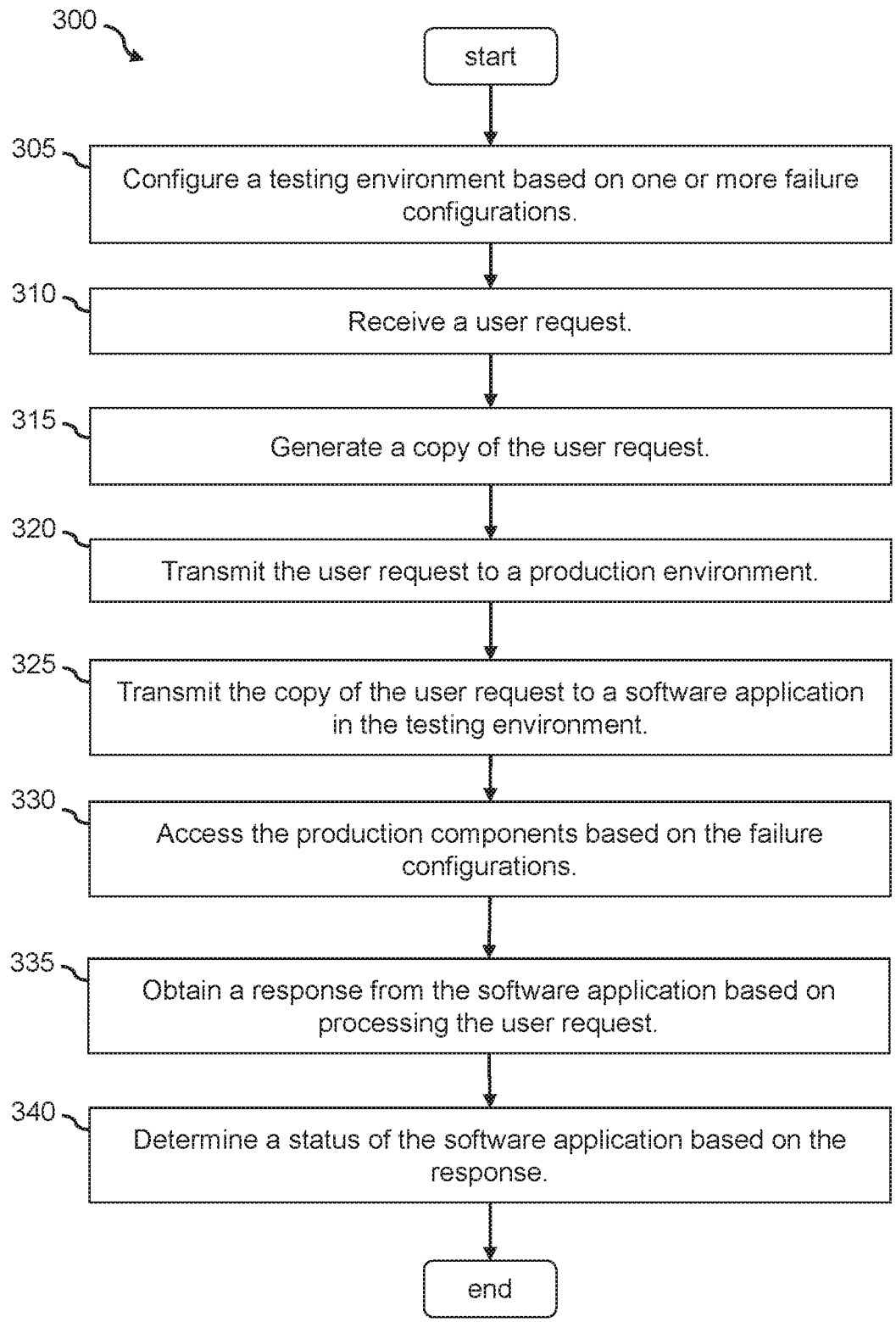
FIG. 3 is a flowchart showing a process of testing a software application in a pseudo-production environment according to an embodiment of the present disclosure.

FIG. 3 illustrates a process 300 for testing a software application within a testing environment based on one or more failure configurations. In some embodiments, all or a portion of the process 300 may be performed by the testing module 132, which may be implemented on one or more computer systems. The process 300 begins by configuring (at step 305) a testing environment based on one or more failure configurations according to various embodiments. For example, the testing manager 202 may use the environment configuration module 206 to configure the pseudo-production environment 220 based on one or more failure configurations.

Figure 4:
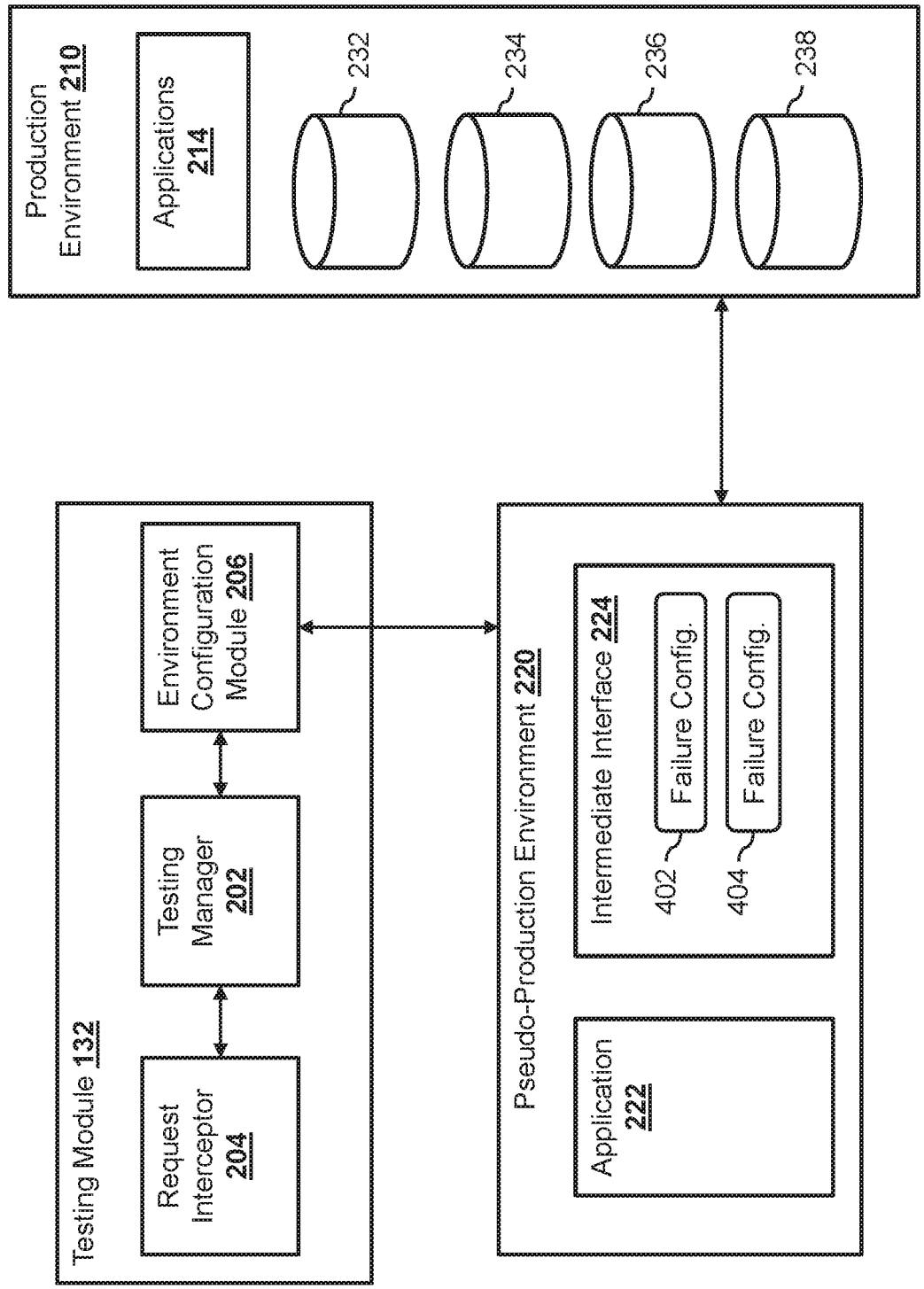
FIG. 4 illustrates a mechanism for configuring the pseudo-production environment based on different failure configurations according to an embodiment of the present disclosure.

In some embodiments, the testing manager 202 may simulate a real-world production component failure in the production environment 210 by using the environment configuration module 206 to configure the intermediate interface 224 of the pseudo-production environment 220. As shown in FIG. 4, the environment configuration module 206 may implement one or more failure configurations 402-404 in the intermediate interface 224 to simulate one or more production component failures in the production environment 210. The one or more failure configurations 402-404 may be determined based on user input (e.g., via a device such as an administrative device 240). As discussed herein, the intermediate interface 224 is provided in the pseudo-production environment 220 for enabling software applications (e.g., the software application 222) running in the pseudo-production environment 220 to access one or more production components in the production environment 210. As such, any request (e.g., a read/write request to a production database node, an API call to a production application) by the software application 222 would go through the intermediate interface 224. Thus, the environment configuration module 206 may configure the intermediate interface 224 to perform one or more actions in response to receiving the request from the software application 222 based on the failure configurations.

In some embodiments, different failure configurations may modify the behavior of the intermediate interface 224 differently. For example, to simulate a database failure associated with a particular production database node from the production database nodes 232-238, the environment configuration module 206 may configure the intermediate interface 224 to return an error signal (e.g., a database connection failed signal, a database unavailable error signal, etc.) when the software application 222 attempts to connect (e.g., transmits a read/write request) to the particular production database node via the intermediate interface 224, even though the particular production database node is online and is connectable by a production application 214 within the production environment 210.

In another example, to simulate a connection failure or a reduction of connection speed associated with a connection to a particular production database node from the production database nodes 232-238, the environment configuration module 206 may configure the intermediate interface 224 to adjust a timeout parameter (e.g., reducing the timeout parameter by a predetermined amount, etc.) of a connection request (e.g., a read/write request) for the particular production database node submitted by the software application 222, such that the connection request to the particular database node submitted by the software application 222 may timeout faster than a similar connection request to the particular database node submitted by a production application 214 within the production environment 210.

In yet another example, to simulate a database schemas compatibility failure, the testing manager 202 may generate (or modify) a local copy of a database schema (e.g., stored locally in the pseudo-production environment 220) that is associated with a particular production database in the production environment 210. In some embodiments, a database schema is a piece of data (e.g., encapsulated in a database schema file) that indicates a structure of a database. The database schema is especially important for databases that store unstructured data, such as NoSQL databases. In some embodiments, a software application may use the database schema to access certain data in the database. When the database schema is changed, it no longer indicates and/or represents the actual structure of the database. Thus, using the changed (incorrect) database schema to access the corresponding database might result in an error or incorrect data returned from the database. As such, to simulate a database schemas compatibility failure, the environment configuration module 206 may generate (or modify) the local copy of the database schema such that it is different from the actual database schema corresponding to the database. When the intermediate interface 224 receives a request from the software application 222 in the pseudo-production environment 220 to access the particular database, the intermediate interface 224 may use the local copy of the database schema to access the particular database according to the failure configuration, such that incorrect data or an error may be returned to the software application to artificially trigger the database schema compatibility failure.

Referring back to FIG. 3, the process 300 receives (at step 310) a user request and generates (at step 315) a copy of the user request according to various embodiments. As noted above, generating a copy may include saving the user request for later replay as part of the testing process. The process 300 then transmits (at step 320) the user request to a production environment and transmits (at step 325) the copy of the user request to a software application in the testing environment according to various embodiments. For example, after configuring the pseudo-production environment 220 based on one or more failure configurations to simulate one or more production component failures, the testing manager 202 may use the request interceptor 204 to intercept or otherwise obtain user requests (e.g., the user request 230) intended for the production environment 210 and generate a copy of such user requests (e.g., the user request 250). The original user request 230 may be transmitted to the production environment 220 as intended for processing by one or more production applications 214. The testing manager 202 may provide the copies of the user requests (e.g., the user request 250) to the software application 222 for processing within the pseudo-production environment 220 based on the one or more failure configurations as part of a testing process for the software application 222.

The process 300 then accesses (at step 330) the production components based on the failure configurations according to various embodiments. For example, while processing the user request 250, the software application 222 may attempt to access a production component, for example, by sending a read/write request to a production database node, by sending an API call to a production application, etc. However, since the intermediate interface 224 intercepts the request from the software application 222, the intermediate interface 224 may perform one or more actions based on the request and the one or more failure configurations. For example, when the request is a read/write request for a particular production database node, and the one or more failure configurations include a failure configuration for simulating a failure of the particular production database node, the intermediate interface 224 may not relay the request to the particular production database node. Instead, the intermediate interface 224 may disregard the read/write request and return an error (e.g., a connection error, a database node unavailable error, etc.) to the software application 222, even though the particular database node is still operating and connectable by a production application 214 in the production environment 210. In another example where the request is a read/write request for a particular production database node, and the one or more failure configurations include a failure configuration for simulating a reduction of connection speed associated with a connection to the particular production database node, the intermediate interface 224 may modify a timeout parameter (e.g., reducing the timeout parameter from 500 ms to 10 ms) or delay relaying the request to the production database node (e.g., delaying the transmitting the request to the production database node by a predetermined amount of time, etc.), and may transmit the request with the modified timeout parameter to the particular production database node.

In another example where the request is a read/write request for a particular production database node, and the one or more failure configurations include a failure configuration for simulating a database schemas compatibility failure associated with the particular production database node, the intermediate interface 224 may use a modified (e.g., corrupted) database schema for accessing the particular production database node based on the request. In another example where the request is an API call for a particular production application, and the one or more failure configurations include a failure configuration for a failure of the particular production application, the intermediate interface 224 may not relay the API call to the particular production application. Instead, the intermediate interface 224 may disregard the API call and return an error (e.g., a connection error, an application unavailable error, etc.) to the software application 222, even though the particular application is still operating in the production environment 210.

The process 300 then obtains (at step 335) a response from the software application based on processing the user request and determines (at step 340) a status of the software application based on the response according to various embodiments. For example, the testing manager 202 may obtain a response to the user request 250 from the software application 222 after processing the user request 250. The response may be data that is requested in the user request 250, an indication that a transaction associated with the user request 250 is successful or not, or an error indication. In some embodiments, the testing manager 202 may analyze the response to determine if the response corresponds to a correct or expected response (e.g., a predetermined response based on the specification of the software application 222 and the simulated product component failure) according to the specification of the software application 222. The testing manager may determine a status (e.g., pass or fail) of the software application based on the response (e.g., passes if the response corresponds to the correct response and fails otherwise).

By configuring the pseudo-production environment 220 according to different failure configurations, the testing module 132 may simulate different production component failures in the production environment 210 for testing the software application 222 in the pseudo-production environment 220 without actually affecting the production components in the production environment 210. In some embodiments, the different failure configurations may include failure configurations corresponding to the same type of failures associated with different production components, different types of failures associated with the same and/or different production components, and/or vary degrees of the same type of failures for the same and/or different production components. For example, the different failure configurations may include failure configurations associated with the same type of failures (e.g., connection failure, component disconnected, etc.) for different production components. As such, the different failure configurations may include failure configuration A that is associated with a connection failure with production database node 232 and failure configuration B that is associated with connection failure with production database node 234.

The different failure configurations may also include different types of failures associated with the same production components. For example, the different failure configurations may include failure configuration C that is associated with a database schema compatibility failure with production database 236 and failure configuration D that is associated with a bandwidth reduction failure with production database 236.

The different failure configurations may also include vary degrees of the same type of failure. For example, the different failure configurations may include failure configurations of varying degrees of reduction of connection speed with a production component (e.g., 10% reduction, 20% reduction, 50% reduction, etc.), varying degrees of reduction of network bandwidth with a production component (e.g., 10% reduction, 20% reduction, 50% reduction, etc.), varying degrees of latency (e.g., adding 5 ms to the time for accessing a production component, adding 10 ms to the time for accessing a production component, etc.). As such, the different failure configurations may include failure configuration E that is associated with network speed reduced to 10 Mbps for production database node 232 and failure configuration F that is associated with network speed reduced to 2

Mbps for production database node 232. In another example, the different failure configurations may include failure configuration G that is associated with increase latency by 5 ms for connecting to production database node 232 and failure configuration H that is associated with increase latency by 10 ms for connecting to production database node 232.

In some embodiments, the testing module 132 may configure and re-configure the pseudo-production environment 220 based on various failure configurations according to a schedule (e.g., determined based on user input via the administrative device 240) or randomly based on a configuration randomizer. For example, the testing module 132 may configure the pseudo-production environment 220 based on a first failure configuration to simulate a first production component failure in the pseudo-production environment 220, and may test the software application 222 in the pseudo-production environment 220 by providing copies of the user requests received in real-time during a first period of time to the software application 222 for processing. The testing module 132 may then re-configure the pseudo-production environment 220 based on a second failure configuration to simulate a second production component failure in the pseudo-production environment 220, and may test the software application 222 in the pseudo-production environment by providing copies of the user requests received in real-time during a second period of time to the software application 222 for processing. The testing module 132 may continue to re-configure the pseudo-production environment based on different failure configurations according to a predetermined schedule such that the software application 222 is tested under an environment that simulates different production component failures.

In some instances, certain defects of the software application may not occur (be detected) when only a single failure exists, but rather, may occur only when the software application encounters a specific combination of production component failures. For example, the software application may require data access from two database nodes when processing a user request. The defect of the software application may occur only when the connection speed to a first database node drops below 2 Mbps and when a second database node is completely down. Thus, the testing module 132 of some embodiments, may generate different combinations of failures (e.g., by combining one or more failure configurations) and may configure the pseudo-production environment 220 according to the different combinations of failures for testing the software application. In one embodiment, the testing module 132 may access the available failure configurations, whereas discussed above, the failure configurations may correspond to the same type of failure for different production components, different types of failures for the same or for different production components, and/or varying degrees of failures for the same production components. The testing module 132 may then generate different combinations of such failure configurations. For example, the testing module 132 may generate a combination of failure configurations A+C, where failure configuration A simulates failure X on production database node 232 and failure configuration C simulates failure Y on production database node 234. In another example, the testing module 132 may generate another combination of failure configurations B+C+D, where failure configuration B simulates failure Z on production database node 236, failure configuration C simulates failure Y on production database node 234, and failure configuration D simulates failure X on production database node 234. (Note that a failure "on a production database node" in these preceding examples may also refer to a network connection failure mode for that database node—e.g. increase in dropped packets and/or connections, increase in latency, etc.) In some embodiments, the testing module 132 may generate as many permutations of combinations of failure configurations as possible, and repeatedly re-configure the pseudo-production environment 220 according to the different combinations of failure configurations for testing the software application.

The testing manager 202 may monitor responses (and/or behavior) of the software application 222 when the software application 222 processes the copies of the user requests under different simulated production component failure (e.g., analyzing the responses, determining that the software application 222 freezes or becomes unresponsive, etc.). In some embodiments, the testing module 132 may then determine a status of the software application 222 based on the responses and/or behavior of the software application 222 during the testing process. For example, when it is determined that the way that software application 222 responds and/or behaves satisfies one or more predetermined test requirements (e.g., responds and/or behaves according to designed or a specification of the software application) during the testing process, the testing module 132 may determine that the software application 222 has passed the test and is ready to be released to the production environment 210. On the other hand, if it is determined that the way that the software application 222 responds and/or behaves fails one or more predetermined test requirements (e.g., not according to design or outside of the specification) when processing a user request under any one of the feature configurations, the testing module 132 may determine that the software application 222 is defective and is not ready to be released to the production environment 210. Furthermore, the testing module 132 may determine under which failure configuration(s) that the software application fails a test (e.g., responds and/or behaves not according to design) and present a failure report to a device (e.g., the administrative device 240) indicating the failure configuration under which the software application fails. Thus, by testing a software application using real-world user requests and production components and by artificially simulating failure of one or more of the production components, hidden defects of the software application may be detected and cured before it is released to the production environment.

Figure 5:
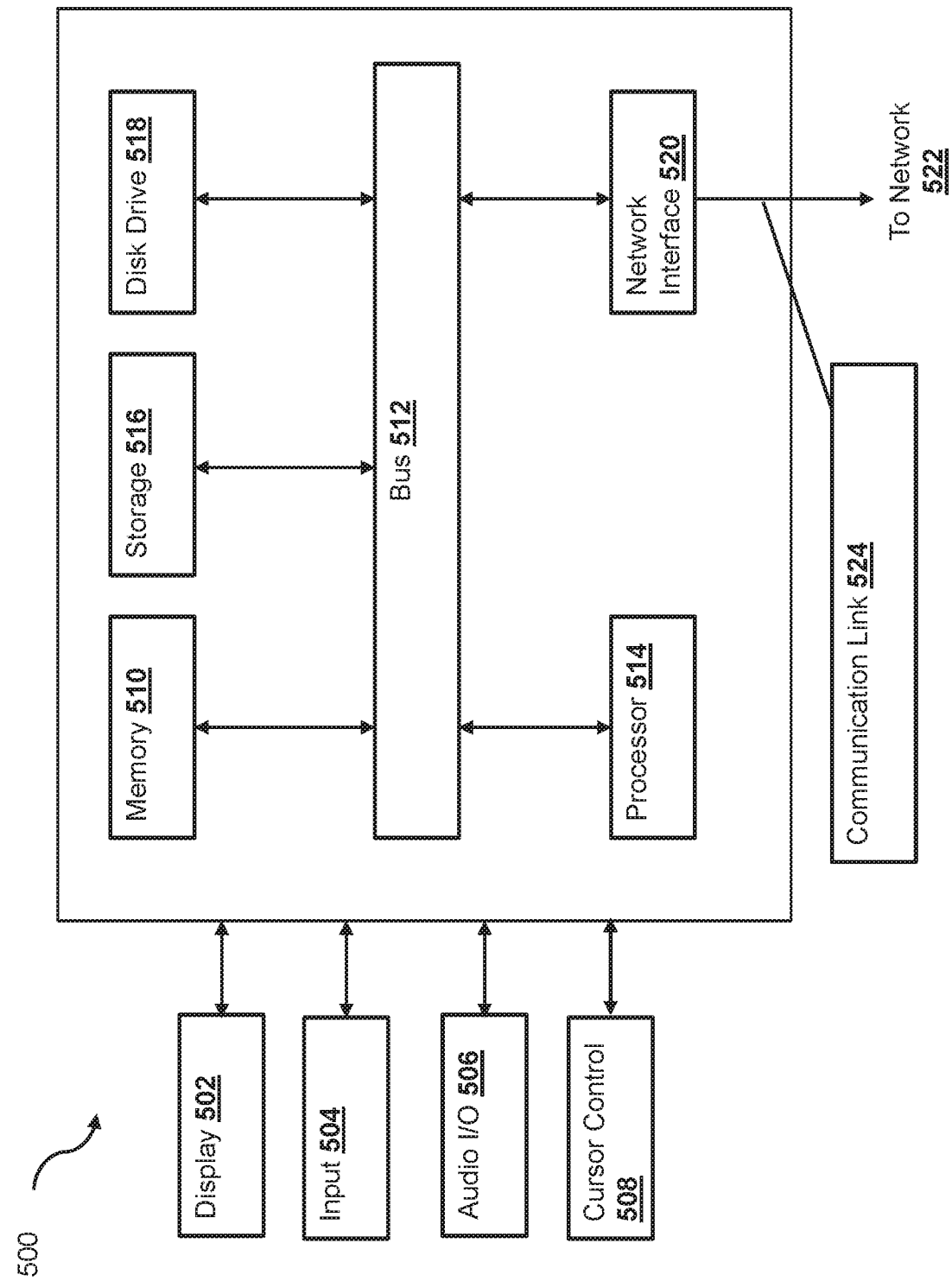
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the software application testing functionalities described herein according to the process 300.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
configuring a testing environment based on one or more failure configurations to simulate one or more failure modes applicable to a production environment;
receiving a transaction request from a user device;
generating a copy of the transaction request;
transmitting the transaction request to the production environment for processing the transaction request, wherein a first transaction processing engine within the production environment is configured to process the transaction request by accessing one or more production database nodes that are in the production environment;
transmitting the copy of the transaction request to the testing environment for processing the copy of the transaction request, wherein a second transaction processing engine within the testing environment is configured to process the copy of the transaction request by accessing the one or more production database nodes according to the one or more failure configurations;
obtaining, from the second transaction processing engine, a response to the processing of the copy of the transaction request; and
determining a status of the second transaction processing engine based on the response.

2. The system of claim 1, wherein the production environment comprises data corresponding to a non-testing application accessible by a plurality of end users.

3. The system of claim 1, wherein the configuring the testing environment comprises configuring an availability setting of the one or more production database nodes, wherein the availability setting places an artificially induced unavailability setting for at least one of the one or more production database nodes to simulate a database node failure mode.

4. The system of claim 3, wherein the operations further comprise:
   receiving, from the second transaction processing engine, a request to access a first production database node of the one or more production database nodes for processing the copy of the transaction request;
   determining an availability of the first production database node based on the availability setting; and
   determining whether to provide the second transaction processing engine access to the first production database node based on the availability of the first production database node.

5. The system of claim 4, wherein the first production database node is determined to be unavailable based on the availability setting, and wherein the operations further comprise restricting the second transaction processing engine from accessing the first production database node.

6. The system of claim 4, wherein the first transaction processing engine is further configured to access the first production database node based on a second availability setting included in the production environment.

7. The system of claim 4, wherein the first production database node is determined to be available based on the availability setting, and wherein the operations further comprise providing the second transaction processing engine access to the first production database node.

8. A method, comprising:
   obtaining a request that requires processing by a software application;
   accessing, by one or more hardware processors, a testing environment based on one or more failure configurations to simulate one or more failure modes applicable to a production environment, wherein the production environment comprises one or more production applications and one or more production database nodes configured to process user requests from users to perform transactions with a service provider using a plurality of software applications that includes the software application;
   transmitting the request to the testing environment for processing the request, wherein a testing software application within the testing environment is configured to process the request by accessing the one or more production database nodes in the production environment according to the one or more failure configurations;
   obtaining, from the testing software application, a response to the processing of the request; and
   determining a status of the software application based on the response.

9. The method of claim 8, further comprising modifying a schema file that defines a database schema of a database associated with the one or more production database nodes to simulate a database schema compatibility failure mode, and wherein the testing software application is configured to access the one or more production database nodes according to the modified schema file.

10. The method of claim 8, further comprising modifying a timeout threshold for connecting to at least one of the one or more production database nodes to simulate a reduction of network speed failure mode, and wherein the testing software application is configured to access the one or more production database nodes according to the modified timeout threshold.

11. The method of claim 8, further comprising:
   obtaining a second request; and
   transmitting the second request to the testing environment for processing the second request, wherein the testing software application is configured to process the second request by accessing the one or more production database nodes according to second one or more failure configurations of the testing environment that simulates second one or more failure modes applicable to the production environment.

12. The method of claim 8, further comprising dynamically re-configuring the testing environment based on different one or more failure configurations to simulate different types of failures in the production environment.

13. The method of claim 8, further comprising:
   intercepting a database write request transmitted by the testing software application for writing data to a first database node; and
   disregarding the database write request.

14. The method of claim 8, further comprising:
   determining that the testing software application passes a set of testing requirements based on the status; and
   in response to determining that the testing software application passes the set of testing requirements, presenting on a user device, a report indicating that the software application is available for the production environment.

15. A non-transitory machine-readable medium having stored thereon machine-readable instructions executable to cause a machine to perform operations comprising:
   configuring a testing environment based on one or more failure configurations to simulate one or more failure modes applicable to a production environment, wherein the production environment comprises one or more production applications and one or more production database nodes configured to process user requests from users to perform transactions with a service provider;
   obtaining a transaction request;
   transmitting the transaction request to the testing environment for processing the transaction request, wherein a software application within the testing environment is configured to process the transaction request by accessing at least one of the one or more production database nodes and/or at least one of the one or more production applications according to the one or more failure configurations;
   obtaining, from the software application, a response to the processing of the transaction request; and
   determining a status of the software application based on the response.

16. The non-transitory machine-readable medium of claim 15, wherein the one or more failure configurations comprise at least one of a failure of at least one of the one or more production database nodes, a reduction of network speed to a connection for at least one of the one or more production database nodes, or an incompatibility of data schemas associated with at least one of the one or more production database nodes.

17. The non-transitory machine-readable medium of claim 15, wherein the one or more failure configurations comprise at least a first failure configuration associated with reducing a speed associated with a connection with a first production database node by a first amount and a second failure configuration associated with reducing the speed associated with the connection with the first production database node by a second amount.

18. The non-transitory machine-readable medium of claim 15, wherein the one or more failure configurations comprise at least one of a first failure configuration associated with reducing a speed associated with a connection with the at least one of the one or more production database nodes and/or the at least one of the one or more production applications, a second failure configuration associated with increasing a packet drop rate associated with the connection with the at least one of the one or more production database nodes and/or the at least one of the one or more production applications, or a third failure configuration associated with reducing a bandwidth associated with the connection with the at least one of the one or more production database nodes and/or the at least one of the one or more production applications.

19. The non-transitory machine-readable medium of claim 15, wherein the configuring the testing environment comprises configuring an availability setting of the one or more database nodes, wherein the availability setting places an artificially induced unavailability setting an at least one of the one or more production database nodes to simulate a database node failure mode.

20. The non-transitory machine-readable medium of claim 19, wherein the operations further comprise:
  receiving, from the software application, a request to access a first production database node of the one or more production database nodes for processing the transaction request;
  determining an availability of the first production database node based on the one or more failure configurations; and
  determining whether to provide the software application access to the first production database node based on the availability of the first production database node.

* * * * *